United States Patent [19]

Nichols

[11] 3,846,404

[45] Nov. 5, 1974

[54] PROCESS OF PREPARING GELLED CELLULOSE TRIACETATE PRODUCTS AND THE PRODUCTS PRODUCED THEREBY

[75] Inventor: Larry D. Nichols, Arlington, Mass.

[73] Assignee: Moleculon Research Corporation, Cambridge, Mass.

[22] Filed: May 23, 1973

[21] Appl. No.: 363,267

[52] U.S. Cl. ............... 260/230, 53/42, 106/196, 117/138.8 E, 117/139.5 C, 117/166, 210/500, 260/13, 260/17 A, 264/41, 264/342 R, 264/DIG. 71

[51] Int. Cl. ..... B01d 39/00, B01d 13/04, C08b 3/06

[58] Field of Search ..... 264/41, 49, 342 R, DIG. 71; 210/500; 106/196; 260/230 R

[56] References Cited
UNITED STATES PATENTS

| | | | |
|---|---|---|---|
| 2,089,769 | 8/1937 | Strout | 53/292 |
| 2,338,787 | 1/1944 | Ushakoff | 264/DIG. 71 |
| 2,751,735 | 6/1956 | Bartlett et al. | 53/292 |
| 2,891,946 | 6/1959 | Volberg et al. | 260/230 R |
| 3,003,846 | 10/1961 | Groombridge et al. | 264/200 |
| 3,412,184 | 11/1968 | Sharples et al. | 264/49 |
| 3,423,491 | 1/1969 | McLain et al. | 264/49 |
| 3,460,683 | 8/1969 | Cannon | 264/41 |
| 3,557,083 | 1/1971 | Sacco | 260/230 R |
| 3,611,669 | 10/1971 | Shepherd | 264/DIG. 71 |
| 3,636,150 | 1/1972 | Rowley et al. | 264/41 |
| 3,673,084 | 6/1972 | King et al. | 264/49 |
| 3,745,202 | 7/1973 | Riggleman et al. | 210/500 |

*Primary Examiner*—Donald E. Czaja
*Assistant Examiner*—Ronald W. Griffin
*Attorney, Agent, or Firm*—Richard P. Crowley

[57] ABSTRACT

Unique gelled cellulose triacetate products, for example, in film or fiber form, prepared by: providing a solution of cellulose triacetate in an acidic nonhydrolyzing solvent; forming the solution into a desired product, such as film or fiber; contacting the product with a nonsolvent for cellulose triacetate which is miscible in the given solvent, to form a gelled product by solvent replacement; recovering a strong, flexible, transparent, high-liquid-content gelled cellulose triacetate product; and optionally removing or replacing all or part of the liquid content to yield modified gels with useful properties. The gelled cellulose triacetate products are useful, for example, as packaging materials by virtue of their strong contraction during drying, good final strength, and heat resistance; as intermediates in the production of cellulose triacetate films and fibers strengthened by drying under tension; as semipermeable membranes; and as carriers for other materials, such as liquids with good lubricating, medicinal or electrical properties.

61 Claims, No Drawings

PROCESS OF PREPARING GELLED CELLULOSE TRIACETATE PRODUCTS AND THE PRODUCTS PRODUCED THEREBY

BACKGROUND OF THE INVENTION

Cellulose acetates are prepared by the esterification of cellulose with acetic acid and acetic anhydride in the presence of a sulfuric acid catalyst. Cellulose triacetates, with acetyl content in excess of about 42 percent, are generally considered separately from cellulose acetates with acetyl content below about 42 percent, because the triacetates, unlike the acetates, are insoluble in most ketones and esters and are not practical thermoplastics, having softening points, even when plasticized, which are too high for convenient nondegradative extrusion. Cellulose triacetates are soluble in certain halogenated hydrocarbons, such as methylene chloride, in certain strong organic acids, such as formic acid; in certain weak organic acids, such as metacresol; and in strong nonacid solvents, such as dimethylsulfoxide, N-methylpyrrolidone and pyridine. Films normally are produced from cellulose triacetates by casting and then drying a viscous solution in a methylene chloride solvent. Fibers are normally spun from the melt using an extremely short dwell time in the molten state. Less commonly, fibers are produced by spinning from methylene chloride. The more soluble and commonly used cellulose acetates are prepared by partial hydrolysis of the triacetate to an acetyl content typically between 30 percent and 40 percent. They can be molded or extruded at moderate temperatures as thermoplastic materials, or films and fibers can be prepared by casting or extruding solutions in acetone or other mild solvents.

The discovery of cellulose triacetate dates from the 1860's, and immense laboratory and commercial effort has been devoted to producing, modifying and processing both the triacetate and acetate. While the cellulose acetates have experienced great commercial success, the high strength and thermal stability of the triacetate has never been fully exploited because of processing difficulties. The triacetate today finds its chief applications as expensive cast film for photographic plates and as spun fiber for synthetic fabrics. The discoveries of this invention comprising cellulose triacetate gels which are readily prepared and conveniently processable, both as new products and as new routes to cellulose triacetate itself, will open up large new areas of commercial utilization of this century-old polymer.

SUMMARY OF THE INVENTION

My invention comprises a novel set of unique gelled cellulose triacetate (GCTA) products, their methods of preparation and modification, and the uses of said products. In particular, my invention relates to flexible, transparent GCTA products consisting essentially of cellulose triacetate (CTA) and a liquid nonsolvent for CTA, in controlled proportions, the composite material exhibiting the high tensile strength of its CTA component in conjunction with a liquid component which is freely replaceable by other liquid nonsolvents, or removable to provide shrunken and/or strengthened products composed essentially of CTA alone. This behavior, as well as permeation data, shows my GCTA products to consist essentially of two interpenetrating phases: a liquid-gellant phase and an ultramicroporous CTA phase.

The GCTA products of my invention are prepared from a solution of CTA in a nonhydrolyzing acidic solvent by forming said solution into a desired product and gelling the product with a cool liquid nonsolvent for CTA which is miscible with the acidic solvent. Suitable combinations of solvent and gelling liquid include, for example, formic acid/water; formic acid/methanol; acetic acid/water; trifluoroacetic acid/water; and metacresol/methanol. The CTA content of the product gels can be controlled by adjusting the concentration of CTA in the parent acidic solution. CTA contents as low as 5 percent are possible using dilute solutions with viscosities of a few hundred centipoises, while CTA contents of 50 percent or more can be obtained using solutions with viscosities of several hundred thousand centipoises, the limit being set by the maximum viscosity compatible with the chosen method of processing.

Removal of all or part of the liquid from my GCTA products, for example, by evaporation, produces new and equally stable GCTA products of reduced liquid content which can be stored indefinitely in a nonevaporative environment. Removal of the liquid component induces irreversible shrinkage, the result of complete removal being a pure CTA product of normal (ca. 1.3 gm/cc) density which has the excellent solvent resistance and thermal stability of CTA prepared in other ways; for example, by casting.

Replacement of all or part of the liquid from my GCTA products by other nonsolvents can be accomplished by simple immersive exchange, the resulting modified GCTA products retaining the approximate transparency and CTA content of the parent GCTA before exchange. These modified GCTA products may then, themselves, be dried or exchanged with other liquid nonsolvents for CTA in the same way.

The tensile strength of my GCTA products approximates that of the contained CTA so long as the liquid component is chosen to have limited solvent power toward CTA. If the liquid component contains solvent or has some solvating power, the tensile strength is decreased. The GCTA products are readily elongated without rupture by 30 to 70 percent, depending on the liquid component. Fibers so elongated and dried are oriented as shown by optical birefringence, and retain essentially the full absolute strength of the original gel fiber, while experiencing a reduction in cross-sectional area of more than an order of magnitude, leading to tensile strengths many times that of standard, unoriented CTA.

In one embodiment, a film or fiber GCTA product of my invention is prepared by casting a film or extruding a fiber of a solution of CTA in a strong water-soluble acid, preferably formic acid or a material of similar acid strength and properties, immersing the cast film or extruded fiber directly after casting into a water bath at a temperature below 35°C; e.g., 0° to 30°C; and recovering a strong, transparent, hydrogel film or fiber from the bath in which displacement of the acid by water is complete. Optionally, the hydrogel product may be successively washed with additional water to remove traces of residual acid, and then immersed in one or more other solvent, each miscible with its predecessor, to effect replacement of the water of the GCTA by other nonsolvents.

On drying, the GCTA film or fiber spontaneously contracts with loss of water or liquid nonsolvent to form a dry, nongelled CTA product which is not reswollen by water or other nonsolvents or swelling agents for standard commercial CTA. Drying under tension; that is, without axial or in-plane shrinkage, produces strong, oriented film and fiber products.

My invention in no way suggests that solutions of cellulose triacetate in strong organic acids are novel. Indeed, the reaction mixture in which cellulose triacetate is prepared represents such a solution. Such solutions have, in the past, been investigated as a route to Loeb-type membranes with special properties induced by unusual additives and controlled evaporation, or used to extrude fibers. The standard commercial cellulose triacetate reaction mixtures are conventionally prepared by the controlled addition of water to precipitate the product. The present invention changes the direction of addition to change grossly the morphology of the product, and to produce a product with the unexpected and unique properties of nonsolvent liquid content, transparency, ultramicroporosity, strength and shrinkability. Further, my invention requires a critical control of temperatures and compositions which have never been hitherto recognized. The gelled cellulose triacetates of my invention, containing, for example, over 75 percent of water or other nonsolvents, are, for the first time, available as readily accessible and highly useful products, both in the gelled and partially dried form.

The GCTA products of my invention, despite their relatively low CTA concentration and high nonsolvent content, are strong, transparent and, in hydrogels, are characterized by a hydrophobic surface. All of my GCTA products consist essentially of cellulose triacetate and water or some other nonsolvent as two distinct interpenetrating phases.

I have found that only a particular class of solvents, of which formic acid is the preferred material, permits a CTA solution to form, on immersion in cool water, my hydrogels, and thus, in turn, the dried or nonaqueous products made from my hydrogels. Surprisingly, I have found that neither mixed cellulose esters nor cellulose acetates of lower acetyl content (e.g., 38 to 40 percent), nor solutions of CTA in other common solvents (e.g., dimethylsulfoxide), provide my hydrogels, but, in comparison, form physically weak, hazy gel products which dry to white, highly fragile materials of wholly different properties. Similar hazy films are produced if gelation temperatures are in excess of 35°C. Methanol and other low melting alcohols can be substituted with water as the gelation medium, and some weakly acidic solvents, such as meta-cresol, which fail to produce strong, transparent gels in water, give excellent products in methanol.

The polymer solutions of my invention comprise CTA and an acidic, nonhydrolyzing solvent for the CTA. Minor amounts of some diluent, such as water or other nonsolvents or additives, such as plasticizers, may be present, as when 90 percent aqueous formic acid is employed. The tolerable upper limit for such a diluent or additive depends on its identity and upon the specific solvent, as well as on the degree of acetylation of the CTA. Generally speaking, excessive amounts of diluents or additives; e.g., more than 10 percent, should be avoided unless modified final gel properties are specifically desired.

I have found that the CTA solutions of my invention may comprise from about 4 to 25 percent of CTA in an acidic nonhydrolyzing solvent. The liquid solvent selected may comprise formic acid or other low melting carboxylic acid, or, with a proper gelling liquid, a low melting, weakly acidic phenolic compound. The reactivity of the solvent should not be so strong as to degrade the CTA by hydrolysis. Typically, the acidity of the solvent should be about the same or greater than that of meta-cresol, but less than that of mineral acids, which degrade the CTA in the solution prior to use. Typically, the solvent ranges from 75 to 96 percent by weight of the solution.

I have found that CTA solvent solutions ranging in viscosity from one hundred to one million centipoises are useful in preparing my gelled film products. Solutions of higher viscosity, except where suitable for fiber extrusion, are putty-like in consistency and difficult to handle. Solutions which include additives, diluents or other materials which preclude the formation of strong, transparent films or fibers should also be avoided.

The liquid gellant employed in my invention may comprise water or any other liquid gellant which is a nonsolvent for the CTA, but which is miscible with the solvent of the CTA solution, the liquid gellant need not include any component normally capable of dissolving or plasticizing CTA. Where a second gellant is replacing another gellant in a gelled product, the second and subsequent gellants need only be miscible with the preceding gellant. The gellant should not excessively swell or soften the CTA, and for this reason, gellants containing appreciable quantities of CTA solvents are not preferred. Typically, an exchange of the solvent for the liquid gellant is effected by contacting, such as by immersing, the formed CTA solution in the liquid gellant for a time sufficient to permit such substitution, and the resultant gelled product washed free of the solvent or first or prior gellant. In one embodiment, my hydrogel products are formed by immersing the formed film or fiber product into water. In another embodiment, a nonaqueous gelled product is formed by immersing the formed film or fiber directly into a nonaqueous bath of some liquid miscible with the CTA solvent employed. Liquid gellants may, for example, comprise hydrocarbons, such as an aliphatic or aromatic liquid, transformer oils, mineral oil, benzene, xylene, glycols, polyols, a plasticizer, or almost any other organic liquid which does not attack CTA.

Strong, self-supporting, nonaqueous gelled film, fiber and other formed products may be prepared which have particular utility as desired, for example, a dielectric sheet material with oil as a gellant, a highly flexible and plasticized film or fiber where a hydrocarbon or ester or polyol is the gellant, or for other purposes and applications. The gellants may be used alone or in combination and with minor amounts of diluents and additives as required.

In another embodiment, minor amounts of a polymeric or monomeric material may be incorporated in the solvent solution or gellant liquid in order to impart desirable properties to the resultant gelled or dried product, such as greater mechanical strength, solvent resistance, flexibility or other properties.

In another embodiment, my hydrogel products may, without loss of their transparency, strength, flexibility or gel character, have their water content substituted in whole or in part by other liquids, including alcohols, such as methanol or ethanol; hydrocarbons, such as mineral oil, benzene or xylene; and polyols, such as glycol or glycerine. Where desired, the gellants may be volatile to facilitate removal and shrinkage by drying, with or without heating, or nonvolatile to impart permanent desired properties to the gelled product, such as plasticizers or oils. Such stable nonaqueous gels based on extremely weak solvents are novel and unexpected, while gels prepared in this way from nonvolatile liquids resist drying and require no protection during storage. Alternatively, a polymerizable liquid, such as methyl methacrylate or styrene, can be introduced into the gel and subsequently polymerized within the CTA matrix to give unusual dual polymers. Thus, by repeated contacting and replacement of the solvent/gellant used, gelled products of different liquid phases with desired properties may be prepared.

Slight variations on the liquid-replacement process allow production of GCTA products which are permanently plasticized even after drying. For example, immersion of GCTA in methanol containing 1 percent of a plasticizer, such as triphenyl phosphate or dimethyl phthalate, produces an easy-to-dry film with much enhanced final plasticity due to residual plasticizer content.

My process of preparing hydrogel products from strong acids requires that the preparation be carried out at a critical temperature of less than about 35°C, and preferably less than 30°C; e.g., 0°C to 30°C, in order to obtain transparent, strong film and fiber products. Where a nonaqueous gellant is employed, such as methanol, I have found that the critical temperature at which haze occurs and the product degenerates in strength and other desirable properties is different, but can be readily ascertained by experiment. For example, with cresol as the solvent and methanol as the gellant, haze in the film product formed occurs at about 40°C.

I have found that my GCTA films contract strongly on drying to provide a dry CTA film which is not swollen or dissolved by subsequent immersion in water or other nonsolvents for standard CTA. My hydrogel film as prepared with water, dries in the absence of restraint with shrinkage of 30 to 40 percent in linear dimensions and reduction by a factor of three in thickness. This same hydrogel film when mounted to prevent in-plane contraction, dries to provide a film which is reduced by a factor of about eight in thickness. Fibers and GCTA products containing a volatile solvent other than water show similar behavior. My GCTA products may be formed into a wide range of forms prior to and on drying. They may be used to prepare shrink-type unions and packages without the application of high heat or special environmental conditions. My GCTA products, such as in film or capillary fiber form, offer attractive permeability and strength for membrane applications, such as for reverse osmosis, dialysis and ultrafiltration. Drying my GCTA products under tension provides for oriented film and fiber products with enhanced strength in the direction of orientation. Such products display the known clarity and thermal stability of CTA in combination with highly uniform thickness and tensile strengths in excess of 30,000 psi.

Other applications of my aqueous and nonaqueous GCTA products and the dried products therefrom include, but are not limited to: home and blister packaging; shrinkable twines with and without a pressure-sensitive adhesive coating; shrinkable tapes; shrinkable bandages; soft contact lenses; self-sealing bottle caps; humidifying coatings; self-contracting electrical insulation; photographic emulsions; shrinkable photographic or printed images; as a strong, water or electrolyte-rich layer in laminates; as a carrier for aromatic or lubricating fluids; as a conductive, permeable and conformal coating for microelectrodes used in vivo; and as a means for producing a wide range of shaped and formed CTA products for applications where the high service temperature (near 400°F) of CTA and/or its high strength recommend its use.

My gelled CTA products may be formed as film or fiber and shrunk with or without tension to provide oriented or unoriented products. Films cast on a nonadhering substrate, such as a glass plate, separate spontaneously from that plate within 60 seconds after immersion in cool water, and can immediately be handled. The thickness of gelled films was found to be accurately predictable from the initial solution concentration and the observed fact that the hydrogel as initially formed contains slightly less than twice the weight concentration of CTA in the original solution. All evidence of solvent; e.g., formic acid, was removed from films up to 20 mils thick by washing with cool water for a few minutes. Unless material with a compact skin is desired for membrane applications, the polymer solution, after casting or extrusion, should be immersed in water or the gellant liquid before substantial solvent evaporation occurs. Delays of more than a few minutes with a volatile solvent may lead to inhomogeneous gels whose exposed surface had largely dried prior to immersion.

Supported films may be prepared by casting the solvent solution onto a substrate, such as a woven or nonwoven sheet material, or in the case of fibers, about another material, or the fibers formed into a woven or nonwoven sheet material. The CTA solution may, for example, be cast onto a fabric material, and the supported cast film then immersed into the gellant liquid to form a gelled, adhering layer secured to the fabric which may be subsequently dried and shrunk.

While pure polymers other than CTA, including cellulose acetate-propionate and acetate-butyrate, have been found not to give rise to strong, clear gels when treated by the process of my invention, other polymers, such as, for example, Nylon-6, acrylates, etc., can be included along with CTA in the original polymer solution without inhibiting the gel-forming process. The composite gels thus formed are hazier than the nonpolymer-containing gels, and, for example, show some deterioration in strength when the ratio of Nylon to CTA exceeds 1:4, but are much stronger than non-CTA-containing gels and show shrinkage properties similar to pure CTA gel.

For the purposes of illustration only, my invention is described largely with reference to the preparation of GCTA film and fibers. However, my process can be employed to produce a wide variety of other shapes and forms. The CTA solutions as illustrated in the examples are preferably cast or extruded at room temperature (20°-25°C), but such solutions may be heated to reduce viscosity, so long as the solution temperature is sufficiently below the boiling point of the solvent used, so that there is no appreciable volatilization of the solvent prior to or during the casting or extruding step, and so long as the gelation temperature is low enough to produce a strong, transparent gelled product.

DESCRIPTION OF THE EMBODIMENTS

EXAMPLE 1

Various commercial grades of CTA from different manufacturers with acetyl content in excess of 42 percent were each dissolved in 90 percent aqueous formic acid in the amount of 7.5% CTA by weight. A film of the viscous solution prepared was blade-coated onto a smooth glass surface at room temperature; e.g., 20°C, with a 10 mil blade gap. The plate and film were promptly immersed in a flowing 13°C water bath. Spontaneous separation of the film from the plate began in 15 seconds, and the gelled film was lifted from the glass after 30 seconds. The gelled film was worked in flowing water for 10 minutes to remove all indication of formic acid. The gelled film was found to be 3.7 to 4.0 mils in thickness, and did not change in appearance or dimensions upon prolonged storage in water. The gelled film so prepared was highly transparent, hydrophobic as shown by beading of superficial water on its surface, and strong enough for easy handling.

EXAMPLE 2

The experiment of Example 1 was repeated with a 20 mil blade gap. The times for separation from the glass and total washing time were about doubled. The final gelled film measured 7.7 to 8.0 mils thick and appeared otherwise identical to the film of Example 1.

EXAMPLE 3

The solution of Example 1 was allowed to drain through a 2 mm orifice, forming a fiber which after about one-fourth inch of fall through air passed into a vertical water column 100 cm deep, the water being at a temperature of 15°C. Gelation occured before the falling fiber reached the bottom of the column, and the recovered fiber, after thorough washing, was strong and transparent, with a cross-sectional area equivalent to a circular diameter of 25 to 27 mils.

EXAMPLE 4

Gelled films prepared by the method of Example 1 were allowed to dry in air at room temperature without heating or forced circulation. Weights and dimensions were recorded with time. Shrinkage of the film occurred and was essentially complete after 30 minutes, while weight loss of the water continued for a total of about 50 minutes. The change in weight corresponded to an initial gelled film containing 84.5 percent water by weight. The samples shrank 42 percent in each of their lateral; i.e., in-plane, dimensions and 60 percent thickness. Infrared spectra showed the final dried film material to be indistinguishable from standard cellulose triacetate.

EXAMPLE 5

A series of experiments were conducted to determine gelled film properties at various CTA concentrations in the standard formic acid casting solution as prepared in Example 1, and the results tabulated below:

TABLE I

| CTA Conc. in Casting Solution | Viscosity at 25°C in centipoises | % Water in the Hydrogel | % Lateral Contraction during Drying | % Reduction in Thickness |
|---|---|---|---|---|
| 4% | 950–1000 | 93.5% | 56% | 74% |
| 8% | 19,000–20,000 | 85% | 42% | 60% |
| 15% | 750,000 | 70% | 30% | 45% |
| 25% | * | 55% | 22% | 24% |

TABLE I-Continued

| CTA Conc. in Casting Solution | Viscosity at 25°C in centipoises | % Water in the Hydrogel | % Lateral Contraction during Drying | % Reduction in Thickness |
|---|---|---|---|---|

* Putty-like consistency and castable with difficulty; viscosity estimated at more than 107 cp.

I have found that CTA solutions of about 4 to 20 percent by weight are preferred for preparing my gelled film products. The preferred viscosity range of the CTA solutions for use in my process, particularly for casting film products, ranges from about 100 to 1,000,000 centipoises at 25°C. Higher viscosity solutions are permissible where the product is formed by high-pressure extrusion, such as for the formation of fiber products.

EXAMPLE 6

A gelled fiber sample prepared according to the method of Example 3, but with a 1.5 inch fall through air and a diameter of about 10 mils, was allowed to air dry at about 20°C without heating or forced circulation. Axial contraction occurred on drying and was essentially complete in 30 minutes, amounting to a 33 percent reduction in fiber length.

EXAMPLE 7

The experiment of Example 1 was repeated using 97 percent formic acid as the solvent in place of 90 percent formic acid. No changes in procedure were required, and the final film product was indistinguishable from that of Example 1.

EXAMPLE 8

The experiment of Example 1 was repeated using trifluoroacetic acid as the solvent. The solution had a somewhat reduced viscosity and blade-coated to a slightly lower thickness. The gelled product appeared identical with the product of Example 1.

EXAMPLE 9

The experiment of Example 1 was repeated using glacial acetic acid as the solvent. The rate of solution of the CTA was retarded and heating was required to achieve a homogeneous CTA solution without excessive delay. Immersion of the coated film in water produced a gelled product generally similar to that of Example 1.

EXAMPLE 10

The experiment of Example 1 was repeated using a solvent consisting of 80 percent glacial acetic acid and 20 percent acetic anhydride. The rate of solution was improved, but the water-gelled films showed a slight haze and the final, dry film was very brittle compared to the gelled product of Example 1. Shrinkage and weight loss were similar to those of Example 4.

EXAMPLE 11

The experiment of Example 1 was repeated using a solvent consisting of 66.6 percent glacial acetic acid, 16.6 percent acetic anhydride, and 16.6 percent orthophosphoric acid. The rate of solution was slow. Gelled films were highly transparent, but somewhat brittle when dry. Shrinkage and weight loss were similar to those of Example 4.

EXAMPLE 12

The experiment of Example 1 was repeated with the water bath held at various temperatures from 15°C to 50°. A slight haze in the gelled film was evident at 35°C, and increasing bath temperature above 35°C led to increased haze and loss of film strength. Films gelled below 35°C were transparent and strong.

EXAMPLE 13

Films prepared according to Example 1 were placed in warm 50°C water after gelation was complete. There was no perceptible hazing. Similarly warming in air, while inducing drying and shrinkage, gave no haze.

EXAMPLE 14

The experiment of Example 1 was repeated using the solution of Example 1 after storage at about 20°C for 2 weeks. Hazy, somewhat weak gelled films were produced. Films prepared from samples less than 1 week old showed no deterioration.

EXAMPLE 15

A series of film samples prepared according to Example 1 were allowed to dry partially in air to various degrees of dehydration, and then reimmersed in fresh water to determine the stability of the partially dried gels with regard to rehydration or further water loss. All such samples showed a slight (about 10 percent) rehydration upon reimmersion in water and were thereafter stable, allowing the preparation of partially dried gelled products ranging from 10 to 85 percent water.

EXAMPLE 16

Film specimens prepared according to Example 1 were immersed in water at temperatures from 30° to 120°C (under pressure) to determine the effect of annealing in an aqueous environment. Shrinkage and reduction in water content occurred rapidly at the higher temperatures, little further change being noted after a few minutes. Final properties at the various temperatures were as follows

| Temperature °C | Weight Loss % | Remaining Water % | Lateral Shrinkage % | Thickness Loss % |
|---|---|---|---|---|
| 30 | 0 | 85 | 0 | 0 |
| 45 | 4 | 84 | 1 | 2 |
| 60 | 13 | 83 | 4 | 8 |
| 75 | 18 | 82 | 5 | 11 |
| 90 | 37 | 76 | 12 | 22 |
| 100 | 55 | 45 | 20 | 35 |
| 120 | 77 | 35 | 34 | 56 |

EXAMPLE 17

Gelled film specimens prepared according to Example 1 were immersed in 5 percent sodium chloride brine and in 0.1 normal HCl and 0.1 normal NaOH to test gel stability to these conditions. The brine produced a 3 percent weight loss with no discernible contraction even after 9 days. The HCl had similarly little or no effect. In contrast, the dilute base caused a 33 percent lateral contraction and a 50 percent loss in weight in less than one day.

EXAMPLE 18

Film specimens and fiber specimens prepared according to Examples 1 and 3 were subjected to mild tensile stretching to observe general response to such loading. Elongations before breakage were 40 to 50 percent for the fibers and films. Partially reversible surface exudation of water droplets was observed on both film and fiber under tensile stress.

EXAMPLE 19

Tensile strength of gelled fiber prepared essentially as in Example 3 was measured with the samples totally immersed in water to avoid drying and ensure equilibrium water content. Three tests gave values of 2,860 psi, 2,210 psi and 1,955 psi, with the scatter traceable to imperfections and variations in diameter. These values corrected for the percentage of polymer in the gelled fibers approximate the tensile strength of dry CTA fibers.

EXAMPLE 20

Experiments were performed to determine the effect of drying film and fiber specimens prepared according to Examples 1 and 3 respectively without allowing lateral or axial contraction. The samples were rigidly mounted without restricting air circulation to all surfaces. Films prepared in this way were smooth and glossy, highly transparent, and showed an overall reduction in thickness of 88 percent during drying. Fibers showed the equivalent volume loss by a reduction of 65 percent in diameter.

EXAMPLE 21

Tensile strength was determined to be 35,000 psi on a fiber specimen prepared according to Example 3 which was dried at constant length. This specimen, as well as similar specimens, dried at various elongations and applied tensions have tensile strengths superior to standard CTA fibers and in many cases, show optical birefringence.

EXAMPLE 22

Experiments similar to those of Example 1 were performed with various commercial grades of cellulose acetate-propionate and acetate-butyrate replacing CTA. All gelled films were extremely hazy and weak, and dried to white, fragile materials.

EXAMPLE 23

Film specimens prepared according to Example 1 were partially dried to various degrees and then reequilibrated with fresh water to determine the stability of gels with intermediate water contents. The samples showed a slight regain upon reimmersion and were thereafter stable at their modified water contents.

EXAMPLE 24

An experiment was performed, wherein 2 parts of CTA were dissolved in a mixture of 1 part methanol with 7 parts methylene chloride. The solution was extremely viscous at room temperature, but gelled film specimens were prepared by immersion in (i) methanol, and (ii) 41.5:58.5 methylene chloride:methanol. After recovery, the films were found to be tough and relatively inflexible. Those treated by immersion in methanol contracted only 13 percent laterally and 15 percent in thickness on drying, and were found by weight loss to be initially 35 percent methanol. Those treated by immersion in the mixed methylene chloride-methanol bath contracted 18 percent laterally and 11 percent in thickness on drying, and were found to have contained 56 percent liquid as prepared. Much of the difference in liquid weight percent between the two kinds of materials merely reflects the higher density of methylene chloride.

EXAMPLE 25

An experiment was performed wherein 20 parts of CTA were dissolved in a mixture of 8 parts triethylphosphate with 72 parts glacial formic acid. The solution was very viscous and a film was formed by casting only with difficulty. The film was immersed in water as in Example 1. This gelled film, on drying at room temperature, contracted laterally 17 percent, in thickness 33 percent, and initially contained only 48 percent water.

EXAMPLE 26

The experiment of Example 1 was repeated using as solvents dimethylsulfoxide, N-methylpyrrolidone and meta-cresol. The films obtained, upon immersion in water, were weak and hazy, and dried to fragile white materials. The gelation of the meta-cresol by water was very slow.

EXAMPLE 27

The experiment of Example 1 was repeated using various commercial cellulose acetates with acetyl content below 40 percent. All gelled films were weak and hazy, and dried to white fragile materials.

EXAMPLE 28

The experiment of Example 26 was repeated with the gelation bath containing methanol rather than water. Meta-cresol, as the acidic solvent for the CTA, gave a good, transparent film which contracted laterally 48 percent on drying, and which initially contained 91 percent methanol. Dimethyl sulfoxide gave a highly hazy weak film, while N-methylpyrrolidone gave a white gelled film with too little strength to allow separation from the plate on which it was cast. Similar experiments with meta-cresol as the solvent and methanol as the gellant, but using mixed cellulose esters or cellulose acetate in place of CTA, gave weak, hazy films.

EXAMPLE 29

The experiment of Example 1 was repeated, with metacresol as the solvent and benzene as the gelling liquid in an immersion bath. Gelation was slow (over 15 minutes), and the final gelled film was extremely elastic and easily abraded. It had good clarity, and contracted 55 percent laterally. Its initial benzene content was 95 percent by weight. Use of formic acid as the solvent and benzene as the gellant led to complete failure to gel due to the low mutual solubility of the two liquids.

EXAMPLE 30

The experiment of Example 1 was repeated with methanol as the immersion bath. The gelled film was strong and transparent, containing 88 percent methanol by weight and contracting laterally 44 percent on drying.

EXAMPLE 31

A series of haze versus temperature experiments were performed with films prepared using meta-cresol as the solvent for the CTA and methanol as the gelling liquid. A sample gelled by immersion in the methanol at 30°C was clear; at 40°C was very slightly haze; and a third sample gelled at 50°C was quite hazy. The "haze temperature" for the cresol-methanol system is about 10°C higher than the 30°–35°C found for the formic acid/water system.

EXAMPLE 32

Experiments were performed to test the ability of the gelled film of Example 1 to have its liquid content replaced by liquids other than water. The film specimen produced according to Example 1 was immersed in three subsequent portions of methanol with a dwell time of 5 minutes in each. The resulting methanol-containing gelled film showed no shrinkage or loss of clarity. It was somewhat more elastic than the water-based gel, and dried rapidly in air at room temperature with normal shrinkage.

EXAMPLE 33

The methanolic gel of Example 32 was similarly passed through three successive benzene baths, yielding a methanol-free, benzene-containing gel still with no contraction or loss of clarity. This transparent benzene gel was very elastic and sensitive to abrasion. It dried with high lateral shrinkage of about 50 percent.

Similar results were obtained with such other methanol-miscible liquids as chlorobenzene and methylisobutylketone. Acetone, tetrahydrofurane and nitrobenzene gave highly swollen gels too weak to handle.

EXAMPLE 34

The benzene-containing gel of Example 33 was similarly treated with mineral oil through three baths, with 15 minutes of exposure in each to compensate for the slower diffusion of the viscous mineral oil. The strong, transparent product was a benzene-free, mineral-oil-based gel which could be wiped free of superficial oil and retained for prolonged periods without shrinkage or other modification.

EXAMPLE 35

Samples of the standard water-based gel of Example 1 were treated by immersion in (i) ethylene glycol, and (ii) glycerine. Exchange of the water with the glycol or glycerine was slow, requiring more than one hour to near completion, but proceeded smoothly with no loss in dimensions or clarity. The glycol and glycerine-based gels were softer than the water-based gel, and more sensitive to surface abrasion, but can be stored in air for long periods without drying.

EXAMPLE 36

Experiments were performed to test the ability of common dyes and salts to diffuse into the hydrogel film of Example 1. Water-soluble CIBA Acid Pure Blue was rapidly assimilated from a 1 percent aqueous solution into the gelled film to give an intense blue coloration which could be removed by prolonged (several days) extraction with water, or permanently fixed by drying the gel. Copper sulfate was rapidly assimilated by the gelled film from a saturated aqueous solution to give a pale green gel, which exuded the salt on drying.

EXAMPLE 37

The experiment of Example 1 was repeated with the CTA replaced by various mixtures of CTA and Nylon-6. All gave gelled films after casting and immersion. That with a Nylon-to-CTA ratio of 1 to 9 was slightly hazy and still strong, while a ratio of 1 to 1 was barely translucent and considerably weakened. All Nylon/CTA gels increased in transparency on drying, but none achieved the clarity of the pure CTA gels. The Nylon-containing gels were found to give, after drying under tension, films with improved adhesive and triboelectric properties.

EXAMPLE 38

An experiment was performed to introduce plasticizers into the gelled films and their dried products by treatment with solutions of plasticizers in methanol. 1 percent Solutions of triphenylphosphate and dimethylphthalate in methanol were used for immersion treatment of the methanolic gels of Example 32. Dried films prepared from plasticized gels so treated were softer and more elastic than the corresponding unplasticized products.

EXAMPLE 39

Experiments were performed to cast gelled cellulose triacetate films directly onto or into supporting substrates. The solution of Example 1 was blade-coated with a 10 mil gap onto a nonwoven smooth-finish polyethylene fabric. After immersion in water for gelation, the exposed gel film measured about 3 mils thick, indicating penetration of 1 mil-equivalent into the fabric.

The bond between the fabric and the gelled film was strong and not at all prone to delamination. In a second experiment, the solution of Example 1 was impregnated into plain cotton cloth, from both sides, using a rubber roller against a glass plate. Immersion into water and drying in a rigid frame gave a sample which had the visual appearance of the original cloth, since the drying gel had retracted down into the grain of the fabric, but which was stiffer and more tear-resistant.

EXAMPLE 40

Experiments were performed to determine whether the hydrophobic surface of the gel films of Example 1 were organophilic and readily susceptible to coating and nonaqueous adhesion. Standard pressure-sensitive polyester tape was found to adhere firmly to the gel, and pressure-sensitive adhesive obtained on a release-paper backing transferred readily to the gelled film to provide a gelled CTA tape applicable to most surfaces and capable of shrinking after adhesion. Coatings and adhesives applied in aerosol form also readily adhered to the hydrophobic surface.

EXAMPLE 41

Experiments were performed to evaluate the utility of the gelled film of Example 1 for shrinkable packaging and sealing applications. Small objects, such as bolts and electrical parts, wrapped in the gelled film and twist-sealed (like cellophane-wrapped candy), dried to taut, shape-conforming packages which were strong, highly transparent and resistant to accidental opening. In another experiment, small cup-shaped caps of gelled CTA film were prepared by dip-coating blunt cylinders and gelling in cool water. These caps, when placed over small bottles, dried to taut, tough film seals. Good seals were obtained whether the original fit was snug or loose, and whether or not the bottle contained water not actually in contact with the drying film. Such sealed bottles partially filled with water could be inverted and shaken without leakage.

EXAMPLE 42

Experiments to test the effect of reexposure to water of previously dried CTA prepared from the gels of this invention showed the dry material to be no more susceptible to rehydration than standard commercial CTA prepared by other means.

EXAMPLE 43

A sample of the gelled film of Example 1 was freeze-dried in circulating dry air at a temperature of −10°C. Initial freezing of the gelled sample gave a transparent, but brittle, film, which regained its flexibility during 12 hours of drying without thawing. The final sample had lost its water content and was resistant to rehydration. The dehydration proceeded without lateral shrinkage and with a full 88 percent rejection in thickness.

EXAMPLE 44

Film specimens prepared according to Example 1 were tested in standard cells to determine their performance as semipermeable membranes. At hydrostatic pressures ranging from 200 to 600 psi, the membranes gave water fluxes between 120 and 320 gallons per square foot per day. Tests on Cytochrome-C (molecular weight 12,400) solutions at pressures of 30 and 50 psi gave 85 to 88 percent solute retention at flexes between 30 and 40 gallons per square foot per day. Blue Dextran (molecular weight 2,000,000) solutions at 50 psi gave over 99 percent solute retention at a flux of 56 gallons per square foot per day. The membranes showed little drop in flux with time during the experiments.

EXAMPLE 45

Electrical tests on dried samples of the gelled CTA film of Example 1 showed a dielectric strength of 2 to 3 kilovolts per mil and a dielectric constant of 3.3 to 3.4.

EXAMPLE 46

A sample of benzene-containing gelled film of Example 33 was immersed in three successive portions of a heavy aliphatic oil, thereby replacing its gelling liquid with the oil. The resulting gel was stable not only at room temperature, but retained an equilibrium oil content of 75 percent by weight after exposure to a 125°C oil bath, showing the oil gels to be less prone to thermal loss of liquid than those containing water.

EXAMPLE 47

A sample of the benzene-containing gelled film of Example 33 was immersed in three successive portions of molten eicosane, melting point 36.8°C, thereby replacing its liquid with eicosane. The new film showed a clear change from translucent to transparent at 36° to 37°C, indicating melting of the hydrocarbon within the gel matrix, and allowing use of such a film as a temperature sensor.

EXAMPLE 48

A sample of the benzene-containing film of Example 33 was immersed in a benzene solution of a methanol-insoluble cholesterol derivative, and the resulting film then immersed in methanol. The cholesterol derivative was not lost, but precipitated within the gel matrix as shown by development of translucency.

Thus I have found, from these and other experiments, that my GCTA products are unique materials which can be produced from CTA with acetyl content in excess of 42 percent; in solvents for CTA which are as or more acidic than meta-cresol; by immersion in water below 35°C; by immersion in nonaqueous solvents, such as methanol; by single or repeated displacement of the liquid gellant by another miscible liquid, including normally nongelling hydrocarbons; and from mixtures of CTA with other polymers. I have found that my products can also be prepared with lower liquid content by partial removal, as by evaporation, of the liquid constituent.

My products cannot be prepared from cellulose acetates containing less than 40 percent acetyl groups; from cellulose acetate-propionates or acetate-butyrates; by immersion in water above 35°C, or in methanol above 45°C; from solvents which do not completely dissolve CTA; e.g., acetone; from nonacidic solvents; e.g., dimethylsulfoxide; from hydrolysis-promoting solvents; e.g., aqueous phosphoric acid; from weakly hydrolyzing solvents after prolonged storage where hydrolysis occurs; e.g., 90 percent formic acid more than 2 weeks old; by direct hydration of CTA with water alone; or by use of a solvent and gellant with low mutual solubility.

A large number of areas of commercial utility exist for my GCTA products. While all benefit from the good strength and stability of CTA itself, they rely in various ways on the other specific properties of my novel GCTA materials.

Many packaging applications exist. The ability of GCTA films to shrink on drying provides a convenient method for producing shape-conforming packages without special heating equipment, and the final dried film is tough and transparent. GCTA films are equally suitable for blister packaging, wherein a low pressure is drawn within a package to pull the moist film into the shape of the contained object. In fact, the reduced pressure within the package hastens the drying process. Twines, tapes and stripping can be prepared from GCTA materials, and are self-tightening and strong when dry. Tapes can readily be coated with a pressure-sensitive adhesive, since the GCTA surface is wet well by most organic liquids and glues, and such coated tapes, when coated on one side, retain their shrinkable, self-tightening properties. In another packaging application, moist films of GCTA materials can be laminated with other films to provide a source of moisture to maintain high humidity within a package; for example, to preserve tobacco products.

GCTA materials also lend themselves to a variety of seals, closures and unions. Shrinkable bottle caps dry to taut, strong seals and hold liquids without leakage. Splices and connections between cylindrical or tubular components are readily effected with small cylindrical GCTA films, and dry to tough permanent joints. Adhesive-coated GCTA materials can be used for the same purpose. In addition, a remarkable type of reverse-pressure-sensitive seal can be prepared by making use of the ability of GTCA materials to exude reversibly some of their liquid constituent under pressure. Thus, a standard pressure-sensitive, adhesive surface will adhere to glycerine-containing GCTA film upon gentle contact, but looses adhesion if pressed firmly because the exuded glycerine releases the adhesive bond. After a few seconds, the glycerine is reabsorbed and the seal can again be formed by gentle contact. Many liquids other than glycerine can be used, and the application to household items, such as cereal boxes, is apparent.

There are many electrical applications for GCTA materials. Shrinkable insulation and connectors suggest themselves, and have good heat resistance when dry. GCTA materials containing various liquids with desirable electrical properties are an entirely separate category of useful products. Examples include oil-containing GCTA tape for wrapping high-voltage conductors, where the oil is not only an effective insulator within the tape itself, but exudes to fill any potential voids during the wrapping process; electrolyte-containing GCTA materials as biocompatible electrode sheaths; and high-dielectric-constant liquid-containing films for use in capicitors.

The enhanced strength of CTA products produced by drying GCTA materials under tension or elongation suggests their use as intermediates in the production of such strengthened CTA films and fibers.

Within the biomedical area, one can forsee the use of GCTA materials as shape-conforming bandages and self-tightening tournequets; or, in moist form, as non-dehydrating burn dressings. GCTA bandages and dressings could be impregnated with medications of various types. Going one step further in that direction leads to the concept of medication-impregnated GCTA products as animal implantable slow-release agents.

Many methods for the separation and fractionatinn of chemical materials will benefit through the utilization of GCTA products. As semipermeable membranes, GCTA will find application in aqueous and nonaqueous reverse osmosis, ultrafiltration, and dialysis. Tests have shown GCTA films to possess semipermeable properties combined with excellent liquid fluxes at low pressures. Semipermeability properties could also be utilized for the separation of gaseous components through pervaporization techniques based on GCTA membranes. Gelled films of my new materials can form the basis for thin-layer chromatography and electrophoresis, and will find application as column-packing materials for improved gel permeation chromatography.

As optical materials, the gels can be employed as the basis of flexible contact lenses, or, when filled with a liquid of high refractive index, as a source of films and lenses with unusually high refractivity. Dyes can be readily incorporated into GCTA materials, and after drying under tension, can provide new forms of thin-film-polarizing materials.

Photoreproductive systems can make use of GCTA materials in several ways. Gelled films can provide controlled diffusion of developing species into latent images, or a GCTA film can be used as the basis for a nongelatine photographic emulsion. Images printed on or developed in GCTA films can be reduced in size by drying with shrinkage.

GCTA materials can be used as carriers for liquids while still making such liquids available to perform some useful function over prolonged periods of time. Examples include perfume and cosmetic applications, new forms of carbon paper, semipermanently lubricated bearings, and medicinal applications already mentioned. With temperature-sensitive materials as the liquid component, GCTA materials can be prepared to serve as temperature sensors; for example, by using low melting hydrocarbons, which undergo a translucent-to-transparent transformation within the gel at their melting point, or by incorporating thermochromic liquid crystals into the gel.

A wide range of composite materials can be prepared based on GCTA components. Synthetic leathers can be produced which benefit not only from the moisture permeability of CTA, but also from the controlled porosity of GCTA materials. Fabrics can be impregnated with CTA solutions of the kind described in my invention, and a GCTA film generated directly in the fabric by gelation in situ. Subsequent drying gives a CTA-fiber composite material with the appearance and texture of the fabric, but with improved strength and water resistance. Finally, unusual, composite polymer systems can be prepared by replacing the liquid in a GCTA material with a polymerizable monomer and then conducting the polymerization within the gel matrix. This leads to dual-phase, resin systems characterized by two interpenetrating polymer phases, and a synergistic combination of properties.

What I claim is:

1. A process of preparing a gelled cellulose triacetate product, which process comprises:
   a. providing a polymer solution comprising cellulose triacetate with an acetyl content greater than about 42 percent, and a major amount of a nonhydrolyzing acidic solvent for the cellulose triacetate;
   b. forming the polymer solution into a configuration of the product;
   c. introducing the formed product into contact with an excess of a gelling liquid which is both a nonsolvent for the cellulose triacetate and miscible with the solvent used for a period of time, so as to replace substantially the entire solvent in the formed product with the gelling liquid, the replacement carried out at a temperature low enough to provide an ultramicroporous gelled product having distinct interpenetrating polymer and liquid phases, which in film or fiber form is flexible, transparent and self-supporting; and d. recovering the gelled product so prepared.

2. The process of claim 1 which includes incorporating the recovered product about an object, and evaporating the gelling liquid to effect shrinkage about the object.

3. The process of claim 2 which includes the use of a volatile gelling liquid, wrapping the product about an object, and evaporating the liquid to effect shrinkage of the product about the object.

4. The process of claim 1 wherein the polymer solution comprises from about 4 to 25 percent by weight of cellulose triacetate.

5. The process of claim 1 wherein the polymer solution comprises from about 75 to 96 percent by weight of the solvent.

6. The process of claim 1 wherein the polymer solution contains up to 10 percent by weight of a plasticizer.

7. The process of claim 1 wherein the polymer solution or the liquid gelling agent contains up to 10 percent by weight of a monomeric or polymeric additive.

8. The process of claim 7 wherein the polymeric additive is nylon.

9. The process of claim 1 wherein the polymer solution has a viscosity of from $10^2$ to $10^6$ centipoises at 25°C.

10. The process of claim 1 wherein the acidity of solvent is about the same or greater than metacresol, but insufficient to degrade the cellulose triacetate by hydrolysis.

11. The process of claim 1 wherein the acidic solvent is selected from the group consisting of formic acid, acetic acid, acetic anhydride, trifluoroacetic acid, metacresol and combinations thereof.

12. The process of claim 1 wherein the product is formed by extruding the polymer solution as a fiber or film.

13. The process of claim 1 wherein the product is formed by casting the polymer solution as a thin film.

14. The process of claim 13 wherein the polymer is formed by casting the polymer solution onto a woven or nonwoven supporting sheet material.

15. The process of claim 1 wherein the gelling liquid comprises an aqueous solution.

16. The process of claim 1 wherein the gelling liquid is water or water-soluble organic nonsolvent for the cellulose triacetate.

17. The process of claim 1 wherein the gelling liquid comprises alcohol, glycol or a polyol having a melt-point below 40°C.

18. The process of claim 1 wherein the gelling liquid is a nonaqueous liquid, and wherein the replacement of the solvent is carried out at a temperature of below about 40°C.

19. The process of claim 1 wherein the gelling liquid is an aqueous solution and the replacement of the solvent is carried out at a temperature of below about 35°C.

20. The process of claim 1 wherein the acidic solvent is an acidic phenolic compound, the gelling liquid is an alcohol, and the replacement is carried out at a temperature of less than 40°C.

21. The process of claim 20 wherein the acidic solvent is metacresol, and the gelling liquid is methanol.

22. The process of claim 1 wherein the acidic solvent is a carboxylic acid, the gelling liquid is water and the replacement is carried out at a temperature of from 0° to 30°C.

23. The process of claim 1 which includes the step of drying the gelled product recovered under tension to provide a product of improved strength.

24. The process of claim 23 wherein the gelling liquid is a volatile gelling liquid, and wherein the gelling liquid is removed by drying the gelled product under tension.

25. The process of claim 1 wherein the gelling liquid comprises a volatile nonsolvent and a nonvolatile additive, and which includes the step of removing the volatile nonsolvent from the gelled product to provide a cellulose triacetate product containing the nonvolatile additive.

26. The process of claim 25 wherein the removal of the volatile nonsolvent of the gelling liquid is carried out while the gelled product is under tension.

27. The process of claim 1 which includes drying the recovered gelled product to remove all or a part of the gelling liquid to provide a cellulose triacetate product with a reduced content of gelling liquid.

28. The process of claim 27 wherein the gelled product is heated by immersing the gelled product in hot water.

29. A process of preparing a cellulose triacetate product, which process comprises:
a. providing a polymer solution comprising
i. cellulose triacetate with an acetyl content greater than about 42 percent,
ii. more than 75 percent by weight of a nonhydrolyzing acidic water-miscible solvent, and
iii. up to 10 percent by weight of a diluent additive;

b. forming the polymer solution into a product form;

c. immersing the formed product directly into an excess of water as a gelling liquid for a time sufficient to replace substantially all of the solvent with the gelling liquid at a temperature below about 35°C to provide a gelled product containing cellulose triacetate as a polymer phase and the gelling liquid as a liquid phase, the gelled product being ultramicroporous and in film and fiber form, transparent and self-supporting; and d. recovering the gelled product.

30. The process of claim 29 wherein the polymer solution comprises from about 4 to 15 percent by weight of cellulose triacetate and the acidic solvent is selected from the group consisting of formic acid, acetic acid, metacresol, acetic anhydride, trifluoroacetic acid and combinations thereof, and the replacement of the solvent is carried out at a temperature of from 0° to 30°C.

31. The process of claim 29 wherein the gelling liquid contains a plasticizer or a monomeric or polymeric additive.

32. A process of preparing a gelled cellulose triacetate product, which process comprises:
  a. providing a polymer solution comprising
    i. cellulose triacetate with an acetyl content greater than about 42 percent,
    ii. more than 75 percent by weight of a nonhydrolyzing acidic water-miscible solvent, and
    iii. up to 10 percent by weight of a diluent additive;
  b. forming the polymer solution into a product form;
  c. immersing the formed product directly into an excess of an alcohol, glycol or polyol as a gelling liquid for a time sufficient to replace substantially all of the solvent with the gelling liquid, and at a temperature sufficient to provide a gelled product containing cellulose triacetate as the polymer phase and the gelling liquid as the liquid phase, the gelled product being ultramicroporous and in film and fiber form, transparent and self-supporting; and
  d. recovering the gelled product.

33. The process of claim 32 wherein the solvent is an acidic phenolic compound, the gelling liquid is methanol, and the replacement is carried out at a temperature below 40°C.

34. The process of claim 1 which includes the step of replacing the first and subsequent gelling liquids from the gelled product of the first and subsequently recovered gelled products by contacting the gelled product with a second or subsequent gelling liquid, each of which is a nonsolvent for the cellulose triacetate and which is miscible with the prior gelling liquid to be replaced for a time sufficient to permit the replacement of the prior gelling liquid to obtain a gelled product containing cellulose triacetate as the polymer phase and the last gelling liquid as the liquid phase.

35. The process of claim 34 wherein the gelling liquid comprises a polymerizable liquid, a plasticizer, transformer oil, mineral oil, benzene, xylene or a hydrocarbon.

36. The process of preparing a gelled cellulose triacetate product, which process comprises:
  a. providing a polymer solution comprising cellulose triacetate with an acetyl content greater than about 42 percent, and a major amount of a nonhydrolyzing acidic solvent for the cellulose triacetate;
  b. forming the polymer solution into a configuration of the product;
  c. introducing the formed product into contact with an excess of a first gelling liquid which is both a nonsolvent for the cellulose triacetate and miscible with the solvent used for a period of time, so as to replace substantially the entire solvent in the formed product with the first gelling liquid, the replacement carried out at a temperature low enough to provide an ultramicroporous gelled product having distinct interpenetrating polymer and liquid phases, which in film or fiber form is flexible, transparent and self-supporting; and
  d. contacting the gelled product containing the first gelling liquid with a second gelling liquid which is not a solvent for the cellulose triacetate, but which is miscible in the first gelling liquid to replace all or a part of the first gelling liquid with the second gelling liquid, the replacement carried out at a temperature to provide an ultramicroporous gelled product having distinct interpenetrating polymer and liquid phases, with the second gelling liquid as the liquid phase.

37. The process of claim 36 wherein the first gelling liquid is a volatile liquid and the second gelling liquid is a nonvolatile liquid.

38. The process of claim 36 wherein the second gelling liquid is a polymerizable liquid, a plasticizer, an alcohol, a glycol, polyol, mineral oil, transformer oil or a hydrocarbon.

39. The process of claim 36 wherein the first gelling liquid is water and the second gelling liquid is an alcohol.

40. The process of claim 36 wherein the first gelling liquid is an alcohol and the second gelling liquid is a hydrocarbon or a plasticizer.

41. The process of claim 36 wherein the first gelling liquid comprises methanol and the second gelling liquid comprises a nonaqueous methanol-miscible liquid.

42. The process of claim 35 which includes replacing the second gelling liquid with a third and subsequent gelling liquid in the same manner as the first liquid is replaced by the second.

43. The process of claim 42 wherein the first, second and third gelling liquids are respectively an alcohol, a hydrocarbon and a nonvolatile oil or plasticizer.

44. The process of claim 42 which includes forming the polymer solution into a fiber form, and removing all or a portion of the second or subsequent gelling liquid from the gelled fiber under tension.

45. The process of claim 36 which includes casting the polymer solution onto a supporting substrate and recovering a gelled film containing the second or a subsequent gelling liquid.

46. A gelled, deacidified, cellulose triacetate product composed of:
  a. an interpenetrating cellulose triacetate polymer phase and a gelling liquid phase;
  b. which product is ultramicroporous;
  c. the gelling liquid phase susceptible to replacement by another nonsolvent gelling liquid which is miscible with the gelling liquid phase;
  d. the liquid phase composed of a major amount of the gelling liquid;
  e. the product self-supporting in film or fiber form; and
  f. the product, on removal of the liquid phase without tension, irreversibly shrinkable.

47. The product of claim 46 wherein the gelling liquid in the liquid phase comprises more than 75 percent by weight of the gelled cellulose triacetate product.

48. The product of claim 46 wherein the cellulose triacetate comprises no more than 25 percent by weight of the product.

49. The product of claim 46 wherein the gelled cellulose triacetate is characterized by having the property of being elongated by 30 to 70 percent without rupture of the gelled cellulose triacetate product.

50. The product of claim 46 in oriented dried film or fiber form.

51. The product of claim 46 wherein the gelling liquid in the liquid phase contains a plasticizer, a polymerizable liquid or a polymer.

52. The product of claim 46 in film or fiber form which is characterized as transparent, flexible and self-supporting.

53. The product of claim 46 wherein the gelling liquid in the liquid phase comprises water, alcohol, glycol, polyol, a hydrocarbon, a plasticizer, an ester, an ether, mineral oil, a high dielectric liquid or combinations thereof.

54. The product of claim 46 wherein the gelling liquid comprises methanol, ethanol, benzene, xylene, ethylene glycol, glycerine, chlorobenzene, methyl isobutyl ketone and combinations thereof.

55. The product of claim 46 wherein the gelled cellulose triacetate is in film form and secured to or impregnated into a woven or nonwoven fibrous material.

56. The product of claim 46 in dried fiber form, the fiber dried under tension and characterized by a tensile strength of greater than 30,000 psi. and exhibiting optical birefringence.

57. The gelled product of claim 46 wherein the gelling liquid in the liquid phase comprises a volatile and a nonvolatile liquid, the nonvolatile liquid subject to evaporation on heating, with the nonvolatile liquid remaining as the liquid phase.

58. The gelled product of claim 46 wherein the product contains a polymeric additive in amounts which do not exceed the cellulose triacetate content.

59. The gelled product of claim 46 wherein the gelling liquid in the liquid phase is an organic liquid which is miscible with methanol.

60. The gelled product of claim 46 characterized by a hydrophobic surface, and wherein the gelling liquid is water.

61. The gelled product of claim 46 which comprises the gelled product in flexible film form secured to a supporting sheet material, and wherein the gelling liquid in the liquid phase is a high dielectric liquid, the gelled product suitable for use as a dielectric sheet material.

* * * * *